(12) United States Patent
Browne et al.

(10) Patent No.: US 7,401,834 B2
(45) Date of Patent: Jul. 22, 2008

(54) CHILD SEAT ANCHOR ASSEMBLY AND METHODS OF USE

(75) Inventors: Alan L. Browne, Grosse Pointe, MI (US); Chandra S. Namuduri, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 184 days.

(21) Appl. No.: 11/180,801

(22) Filed: Jul. 13, 2005

(65) Prior Publication Data

US 2007/0013215 A1    Jan. 18, 2007

(51) Int. Cl.
*B60J 7/00* (2006.01)
(52) U.S. Cl. ............ 296/68.1; 297/216.1; 297/253
(58) Field of Classification Search ........... 296/68.1, 296/65.02, 65.03; 297/253, 254, 216.11, 297/216.1
See application file for complete search history.

(56) References Cited

U.S. PATENT DOCUMENTS

| | | | |
|---|---|---|---|
| 2,856,179 A | 10/1958 | Hogan | |
| 4,351,515 A | 9/1982 | Yoshida | |
| 4,673,067 A | 6/1987 | Manning et al. | |
| 4,679,775 A | 7/1987 | Funaki et al. | |
| 4,896,754 A | 1/1990 | Carlson et al. | |
| 4,925,409 A | 5/1990 | Johnson | |
| 4,938,322 A | 7/1990 | Sugasawara | |
| 4,942,947 A | 7/1990 | Shtarkman | |
| 5,018,606 A | 5/1991 | Carlson | |
| 5,099,884 A | 3/1992 | Monahan | |
| 5,336,048 A | 8/1994 | Ganzon et al. | |
| 5,492,312 A | 2/1996 | Carlson | |
| 5,525,249 A | 6/1996 | Kordonsky et al. | |
| 5,573,088 A | 11/1996 | Daniels | |
| 5,607,996 A | 3/1997 | Nichols et al. | |
| 5,900,184 A | 5/1999 | Weiss et al. | |
| 5,944,151 A | 8/1999 | Jakobs et al. | |
| 5,944,152 A | 8/1999 | Lindsay et al. | |
| 5,947,238 A | 9/1999 | Jolly et al. | |
| 5,992,582 A | 11/1999 | Lon et al. | |
| 6,095,486 A | 8/2000 | Ivers et al. | |
| 6,202,806 B1 | 3/2001 | Sandrin et al. | |
| 6,260,675 B1 | 7/2001 | Muhlenkamp | |
| 6,279,700 B1 | 8/2001 | Lisenker et al. | |

(Continued)

FOREIGN PATENT DOCUMENTS

GB    2384217    7/2003

OTHER PUBLICATIONS

U.S. Appl. No. 10/716,371, filed Nov. 18, 2003.

(Continued)

*Primary Examiner*—Joseph D. Pape

(57) ABSTRACT

A child seat anchor assembly includes a fixed portion, wherein the fixed portion is secured to a motor vehicle structural member or a child seat structural member; a latchable portion for releasable engagement with a child seat or a motor vehicle; an energy absorbing mechanism disposed between and in operative communication with the fixed portion and the latchable portion, wherein the energy absorbing mechanism comprises an active material; and a controller in operative communication with the active material, wherein the controller is operable to selectively apply an activation signal to the active material and effect a change in an attribute of the active material, wherein the change in the attribute results in force and acceleration adjusting energy absorption.

20 Claims, 7 Drawing Sheets

U.S. PATENT DOCUMENTS

| | | |
|---|---|---|
| 6,279,701 B1 | 8/2001 | Namuduri et al. |
| 6,302,249 B1 | 10/2001 | Jolly et al. |
| 6,327,024 B1 | 12/2001 | Hayashi et al. |
| 6,380,253 B1 | 4/2002 | Das |
| 6,394,239 B1 | 5/2002 | Carlson |
| 6,427,813 B1 | 8/2002 | Carlson |
| 6,471,018 B1 | 10/2002 | Gordaninejad et al. |
| 6,481,659 B1 | 11/2002 | Ashtiani et al. |
| 6,517,154 B2 | 2/2003 | Sawamoto |
| 6,571,161 B2 | 5/2003 | Browne et al. |
| 6,601,915 B2 | 8/2003 | Sullivan et al. |
| 6,634,710 B1 | 10/2003 | Adamson, Sr. et al. |
| 6,681,905 B2 | 1/2004 | Edmondson et al. |
| 6,767,057 B2 | 7/2004 | Neelis |
| 6,836,717 B2 | 12/2004 | Buechele et al. |
| 2001/0054527 A1 | 12/2001 | Card |
| 2002/0113424 A1 | 8/2002 | Smith, Jr. et al. |
| 2002/0185347 A1 | 12/2002 | Pohl et al. |
| 2003/0001372 A1 | 1/2003 | Browne et al. |
| 2003/0113160 A1 | 6/2003 | Welch et al. |
| 2004/0173422 A1 | 9/2004 | Deshmukh et al. ........ 188/267.2 |
| 2004/0182661 A1 | 9/2004 | Lun ........................ 188/267.2 |
| 2005/0087408 A1 | 4/2005 | Namurudi et al. |
| 2005/0087409 A1 | 4/2005 | Browne et al. |
| 2005/0087410 A1 | 4/2005 | Namuduri et al. |

OTHER PUBLICATIONS

U.S. Appl. No. 10/730,440, filed Dec. 8, 2003.

W. P. Jones, "Investigation of Magnetic Mixtures for Clutch Application," AIEE Trans., 72 (1953), pp. 88-92.

CHILD SEAT ANCHOR ASSEMBLY AND METHODS OF USE

BACKGROUND

The present disclosure generally relates to child seat anchor assemblies, and more particularly to child seat anchor assemblies including tunable force, energy absorbing mechanisms.

Child safety seats have traditionally been secured to motor vehicle passenger seats using an existing seat belt. These seat belts, which are anchored to a fixed structural member of the vehicle at each end, are typically threaded through apertures or slots in the child safety seat before being fastened. This process can be somewhat laborious.

More recently, vehicles are being manufactured with features that improve the ease of securing a child seat to the rear seats of the vehicle. For example, vehicles may include fixed rigid anchors to which restraints that are included on a child seat may be engaged. A child safety seat can be engaged with two lower anchors and an upper anchor. The lower anchors are frequently located in the vehicle seat bight or crack or in an opening in a seat cushion; while the upper anchor is generally located behind the vehicle seat, usually on a rearward shelf or on the floor of a cargo area for those motor vehicles not including a rearward shelf, such as utility vehicles, vans, minivans, station wagons, convertibles, aircraft, buses, trucks, and the like. The anchors are generally metallic and have a U- or C-shaped configuration functioning as a receiving portion for the child seat restraints.

Some child safety seats will be equipped with two lower restraints and most forward-facing child seats will include a top restraint. The restraints may be flexible (e.g., a strap or tether with a hook on the end) or rigid (e.g., an inflexible, firm bar with a latch on the end). The occupant of the child seat is secured to the child seat by a seat belt or other securing harness provided by the child seat.

In the event of a rapid deceleration of the vehicle, such as in an impact event, the child seat and occupant tend to continue moving forward, owing to their inertia, until acted on by tension forces in the child seat restraints. Since the anchors to which the child seat restraints are engaged are rigid mechanical devices, the child seat and occupant, from that point on, tend to experience the same deceleration pulse as the vehicle.

To minimize the effects of the force felt and deceleration experienced by the occupant of the child seat, some child seats are equipped with a force limiting energy absorbing mechanism, such as a tear seam in a tether or strap. Alternatively, some anchors are provided with a force limiting energy absorbing mechanism such as a portion that deforms above a selected stress threshold. These types of energy absorbing mechanisms are irreversible for single use. Once they have been triggered, they must be replaced. More importantly, these energy absorbing mechanisms tend to be operable only at a fixed or non-tunable level of force.

Thus, despite their suitability for their intended purposes, there nonetheless remains a need in the art for improved devices for minimizing the mass dependent deceleration levels experienced by a child seat occupant. It would be particularly advantageous if the response of these devices were tunable, especially in light of the fact that there is great variability in child seat occupant masses and in rates of deceleration. It would also be advantageous if these devices were reversible (i.e., they could be triggered more than once without necessitating complete replacement).

BRIEF SUMMARY

A child seat anchor assembly includes a fixed portion, wherein the fixed portion is secured to a motor vehicle structural member or a child seat structural member; a latchable portion for releasable engagement with a child seat or a motor vehicle; an energy absorbing mechanism disposed between and in operative communication with the fixed portion and the latchable portion, wherein the energy absorbing mechanism comprises an active material; and a controller in operative communication with the active material, wherein the controller is operable to selectively apply an activation signal to the active material and effect a change in an attribute of the active material, wherein the change in the attribute results in force and acceleration adjusting energy absorption.

In another aspect, a child seat anchor assembly comprises a fixed portion, wherein the fixed portion is secured to a motor vehicle structural member or a child seat structural member; a latchable portion for releasable engagement with a child seat or a motor vehicle; a damper disposed between and in operative communication with the fixed portion and the latchable portion, wherein the damper comprises a rheology changing fluid; and a controller in operative communication with the rheology changing fluid, wherein the controller is operable to selectively apply an activation signal to the rheology changing fluid and effect a change in a shear force of the rheology changing fluid, wherein the change in the shear force results in force and acceleration adjusting energy absorption.

A method comprises securing a child seat to a motor vehicle structural member, wherein the securing comprises engaging a restraint of the child seat with a latchable portion of a child seat anchor assembly comprising a fixed portion secured to the motor vehicle structural member; producing an activation signal with a controller; applying the activation signal to an active material of a force limiting energy absorbing mechanism disposed between and in operative communication with the fixed portion and the latchable portion of the child seat anchor assembly, wherein the applying effects a change in an attribute of the active material; and adjusting a force and/or deceleration to which the child seat is subjected with the energy absorbing mechanism.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are deceleration and force limiting energy absorbing child seat anchor assemblies and methods for their use in motor vehicles. In contrast to the prior art, the child seat anchor assemblies and methods are based on active materials, which advantageously allows selective control of the forces and accelerations to which a child, sitting in a child seat that is secured to the motor vehicle by means of the child seat anchor assembly, may be subjected while riding in the motor vehicle, especially while the motor vehicle is undergoing a rapid deceleration event.

The term "active material" as used herein refers to several different classes of materials all of which exhibit a change in an attribute such as dimension, shape, shear force, and/or flexural modulus when subjected to at least one of many different types of applied activation signals, examples of such signals being thermal, electrical, magnetic, mechanical, pneumatic, and the like. A first class of active materials includes shape memory materials. These exhibit a shape memory effect. Specifically, after being deformed pseudo-plastically, they can be restored to an original shape in response to the activation signal. Suitable shape memory materials include, without limitation, shape memory alloys (SMA) and ferromagnetic SMAs. A second class of active materials can be considered as those that exhibit a change in an attribute when subjected to the activation signal but revert back to their original state upon removal of the activation signal. Active materials in this category include, but are not limited to, piezoelectric materials, electroactive polymers (EAP), magnetorheological fluids and elastomers (MR), electrorheological fluids and elastomers (ER), composites of one or more of the foregoing materials with non-active materials, combinations comprising at least one of the foregoing materials, and the like.

The activation signal is dependent on the materials and/or configuration of the active material. For example, a magnetic and/or an electrical signal may be applied for changing the property of the active material fabricated from magnetostrictive materials. A thermal signal may be applied for changing the property of the active material fabricated from shape memory alloys and/or shape memory polymers. An electrical signal may be applied for changing the property of the active material fabricated from electroactive polymers, piezoelectrics, and electrostrictives.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Directional descriptors used herein are with reference to the vehicle. Furthermore, all ranges disclosed herein are inclusive of the endpoints and independently combinable.

Figure 1:
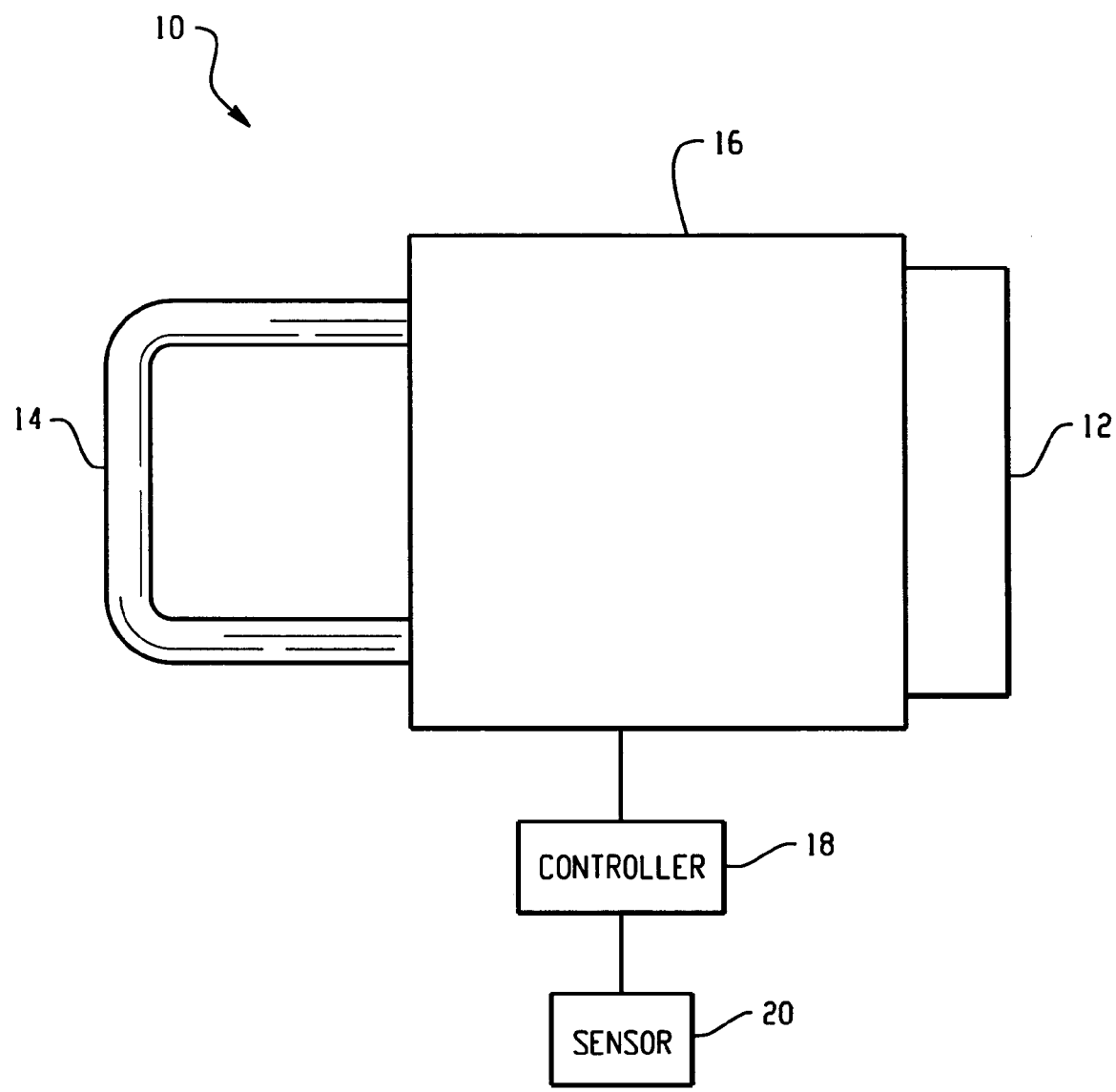
FIG. 1 is a schematic representation of a child seat anchor assembly.

Referring now to FIG. 1, an exemplary child seat anchor assembly is shown. The child seat anchor assembly 10 generally includes a fixed portion 12 secured, either immediately or indirectly, to a vehicle structure (not shown), a latchable portion 14 for releasable engagement with a child seat restraint (not shown), and a deceleration and force limiting energy absorbing mechanism 16, which comprises the active material (not shown). In another embodiment, the fixed portion 12 may be secured, either immediately or indirectly, to a child seat structure (not shown) and the latchable portion 14 may be releasably engageable with a vehicle structure, such as a latch point for a child seat restraint, (not shown).

The deceleration and force limiting energy absorbing mechanism 16 is disposed between, and in operative communication with, the fixed portion 12 and the latchable portion 14. The child seat anchor assembly 10 further includes a controller 18 in operable communication with the active material. The controller 18 is operable to selectively apply the activation signal to the active material to effect the change in the attribute of the active material, which enables the deceleration and force limiting energy absorbing mechanism 16 to function (i.e., to allow displacement at a situationally tunable force level).

Optionally, the child seat latch anchor assembly 10 may include a sensor 20 in operative communication with the controller 18 and configured to periodically or continuously provide relevant information to the controller 18 for selectively applying the activation signal to the active material. Suitable sensors include a child seat and occupant weight sensor, impact sensor, pre-impact sensor, vehicle stability sensor, and the like, and a combination comprising at least one of the foregoing sensors.

In one embodiment, the deceleration and force limiting energy absorbing mechanism 16 is a tunable damper containing a rheology changing fluid (e.g., a magnetorheological or electrorheological fluid) for selectively controlling yield stress between the fixed portion 12 and the latchable portion 14. The damper is configured to tunably dissipate energy though the shear of the rheology changing fluid in contact with portions of the damper that experience relative motion during the rapid deceleration event. Any linear or rotary damper may be used as the deceleration and force limiting energy absorbing mechanism 16.

Suitable linear dampers are described in commonly assigned U.S. patent application Ser. Nos. 10/691,372, 10/691,091, and 10/691,365, all of which were filed on Oct. 22, 2003 and are each incorporated herein in their entireties.

Figure 2:
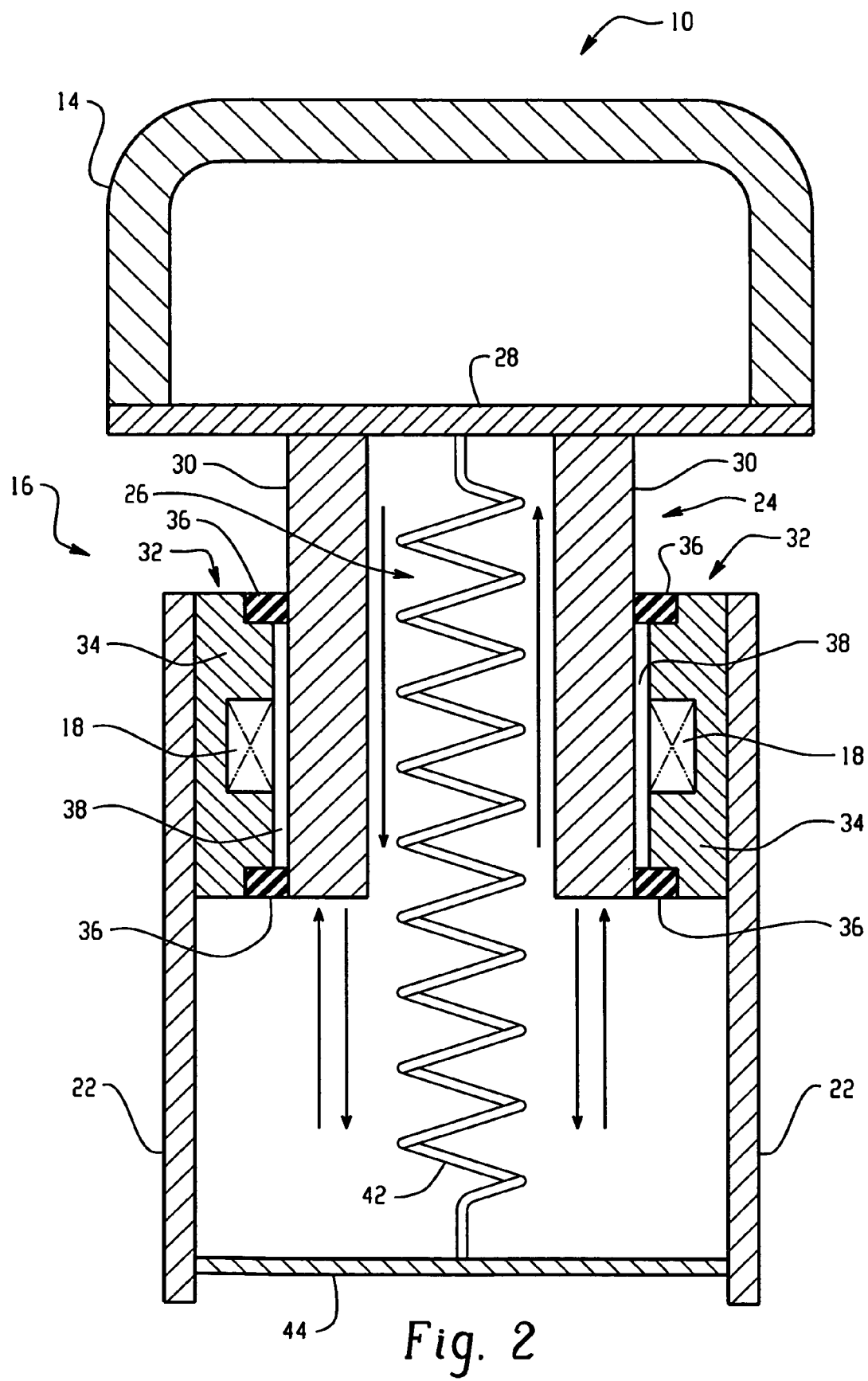
FIG. 2 is a schematic representation of a cross section of a linear damper as the deceleration and force limiting energy absorbing mechanism according to one embodiment.

In one embodiment, a cross section of which is shown in FIG. 2, the deceleration and force limiting energy absorbing mechanism 16 is a linear damper, which includes a stationary framing member 22, a first stroking force generating energy absorbing component 24, and an optional second stroking force generating energy absorbing component 26.

The first stroking force generating energy absorbing component 24 comprises a movable surface 28 supported by support member 30, wherein the rheology changing fluid 38 controls movement. The movable surface 28 is connected to the latchable portion 14. Although the cross sectional view illustrates two framing members 22 and two support members 30, the framing member 22 and support member 30 are preferably cylindrical shaped and formed of a unitary member. If the damper employs an MR fluid, the support member 30 is preferably formed from a soft magnetic material. Soft magnetic materials are defined as those materials that exhibit magnetic properties only when they are subject to a magnetizing force such as a magnetic field created when a current is passed through a wire surrounding a soft magnetic core. Soft magnetic materials are generally comprised of iron such as for example various steels, iron nickel alloys, and the like. High permeability, small coercivity, and saturation under high magnetic field generally characterize their magnetic behavior. However, the specific magnetic characteristics vary considerably depending of their composition and their fabrication processing. The soft magnetic material structure can be either non-oriented (isotropic behavior) or oriented (anisotropic behavior).

The surface structure of the first stroking force generating energy absorbing component 24 generates force and absorbs energy by slidably engaging framing member 22 via control structure 32, which is fixedly attached to the framing member 22. The control structure 32 comprises a cylindrical sleeve 34 having an annular opening dimensioned to accommodate an outer diameter of the support members 30 of the stroking force generating energy absorbing component's 24 surface structure. The cylindrical sleeve 34 is fixedly attached to the framing member 22. Annular seals 36 are disposed at each end of the control structure 32 and abut an outer diameter of support member 30. The annular seals 36 enclose the magnetorheological fluid 38 that the support member 30 is slidably engaged with. Seals 36 also function as bearings during operation of the damper 16. The controller 18, which is preferably a coil for a MR fluid and a pair of electrodes for an ER fluid, is centrally disposed within the cylindrical sleeve 34 in close proximity to the appropriate rheology changing fluid 38.

The optional second stroking force generating impact energy absorbing component 26 includes a linkage 42 (e.g., spring, rolled sheet, wire mesh, foam, collapsible tube or a combination comprising at least one of the foregoing, or the like), fixedly attached at one end to transverse member 44, wherein the transverse member 44 is fixedly attached at each end to framing member 22. In one embodiment, transverse member 44 is connected to the fixed portion (not shown). Alternatively, transverse member 44 is the fixed portion. At the other end, opposite transverse member 44, the linkage 42 is fixedly attached to the movable surface 28.

In one embodiment, the linkage 42 comprises an active material, an attribute (i.e., dimension, shape, shear force, and/or flexural modulus) of which can be changed by activating the active material. In this manner, the stroking force of the second component 26 can also be controllably changed like that of the first stroking force generating energy absorbing component 24. Suitable linkages 42 are described in commonly assigned U.S. patent application Ser. No. 10/716,371, filed on Nov. 18, 2003 and is incorporated herein in its entirety.

Initially, the support member 30 is bottomed out on, or proximal to transverse member 44 and, when the vehicle undergoes the deceleration event, the forward deceleration of the child seat is decreased relative to that of the vehicle by activating the rheology changing fluid 38 with the controller 18. During operation, when an impending deceleration event is detected by a sensor (not shown), the controller 18 is energized to an appropriate selected current level prior to the actual deceleration. Suitable magnetic field strengths generated by the coil and/or a permanent magnet may range from greater than about 0 to about 1 Tesla (T), and may be selected based on information (e.g., the weight of the child seat occupant, the rate of deceleration of the vehicle, an impact velocity, and the like) provided by the sensor. Suitable potentials generated across the pair of electrodes may range from greater than about 0 to about 1 megavolt (MV), and may similarly be selected based on information provided by the sensor. When a forward acceleration of movable surface 28 occurs, the support member 30 is subjected to an opposing shear force owing to the effect of the magnetic field (or electric field) generated by the current on the appropriate rheology changing fluid 38. The energy absorbed is preferably equal to the product of the shear force owing to the rheological fluid effect and the displacement of the movable surface 28. When the optional second energy absorbing component 26 is used with a spring, for example, as the linkage 42, the spring is stretched (below its elastic limit) as a result of the vehicle's deceleration and the resulting displacement of the child seat with respect to the vehicle. The restoration force of spring 42, which is proportional to the spring constant, returns the movable surface 28 to its original position when the activation signal from the controller 18 is discontinued. If the spring 42 is made from an active material (e.g., SMA, ferromagnetic SMA, MR or ER elastomer, EAP, or the like), it can be activated by a different activation signal to facilitate the return of the spring 42 to its original shape, and thereby returning movable surface 28 to its original position. In this manner, the damper 16 and, ultimately, the child seat anchor assembly 10, are reusable. It is also possible for the spring 42 or a plurality of springs 42, made from active materials, to act in conjunction with the rheology changing fluid to control the stroking force of the energy absorbing mechanism 16 to produce the optimum deceleration of the seated child for the given deceleration scenario. In one illustration, by selectively activating one or more SMA linkages, wherein a phase change from martensite to austenite results in an increase in its modulus by a factor of 2.5 to 3.0 for example, more precise control over the stroking force level can be achieved.

Figure 3:
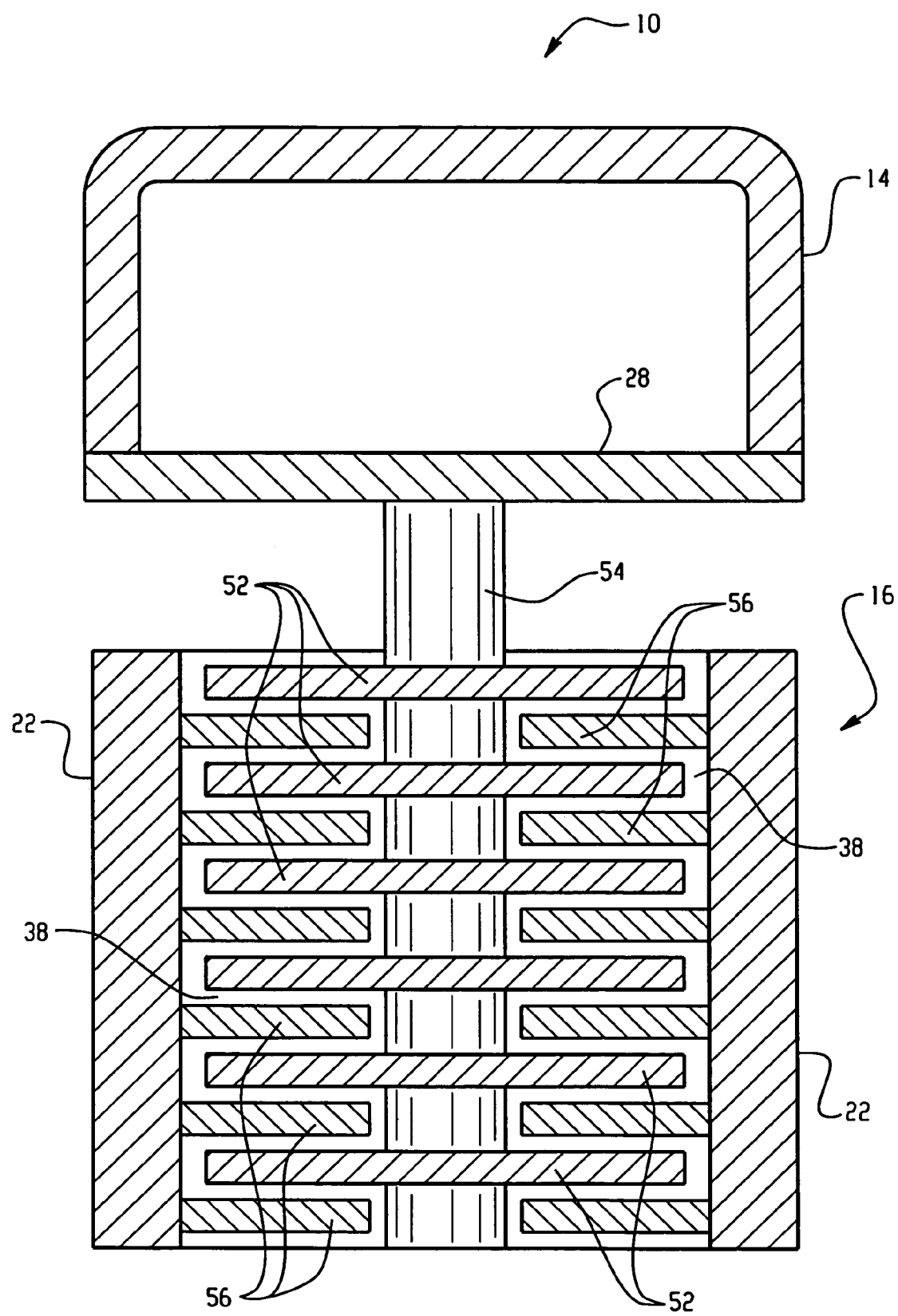
FIG. 3 is a schematic representation of a cross section of a linear damper as the deceleration and force limiting energy absorbing mechanism according to another embodiment.

In another embodiment of a linear damper, as shown in FIG. 3, the energy absorbing mechanism 16 includes the use of multiple layered plates 52 mounted about a shaft 54, wherein each plate is parallel to an adjacent plate. Alternating plates are fixedly attached to a framing member 56 (i.e., stator) and to the shaft 54. A space between the plates 52 is filled with a rheology changing fluid 38, which can be variably controlled to adjust yield stress in shear in the manner previously described. The controller 18 or multiple controllers are disposed about the shaft 54 in close proximity to the rheology changing fluid 38 to provide a magnetic or electric field. Optionally, any of the plates 52 can be a permanent magnet or an electrode to provide a fixed yield stress.

Suitable rotary or torque dampers are described in commonly assigned U.S. patent application Ser. Nos. 10/691,091, filed on Oct. 22, 2003 and 10/730,440, filed on Dec. 8, 2003, both of which are incorporated herein in their entireties.

Figure 4:
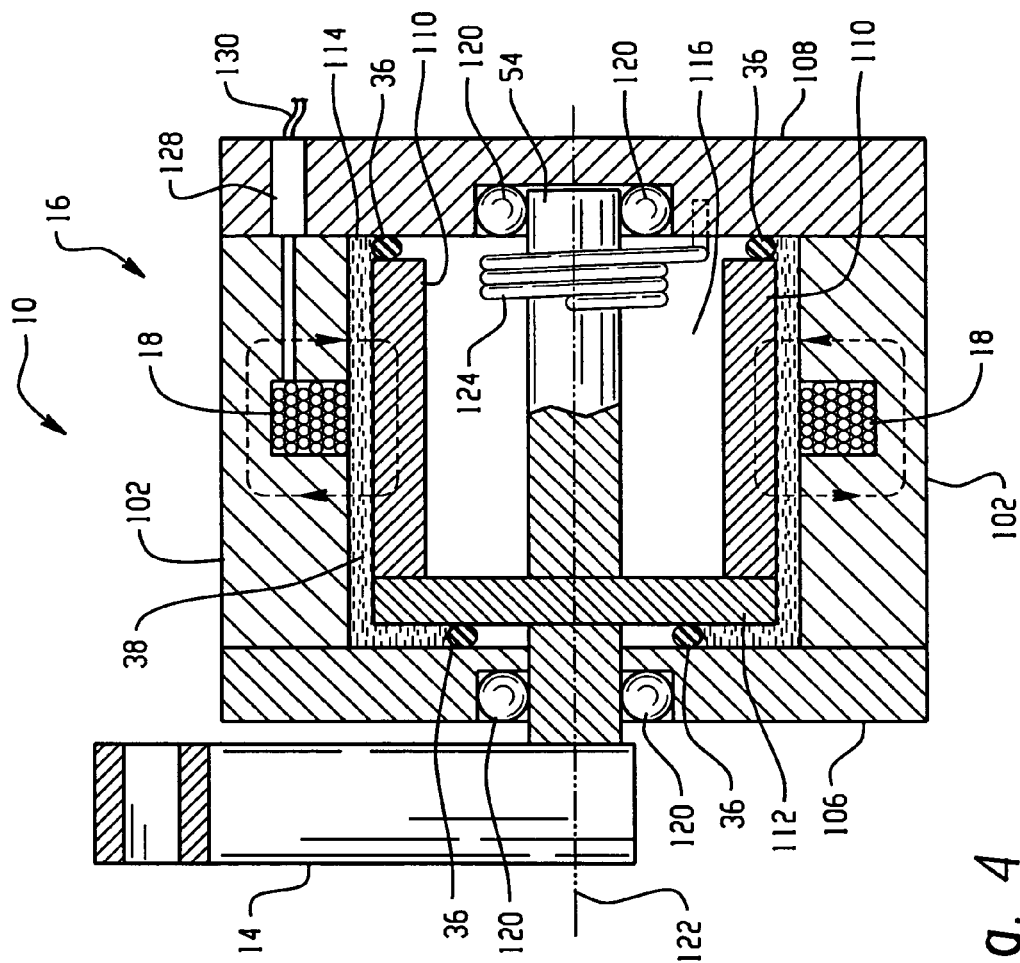
FIG. 4 is a schematic representation of a cross section of a rotary damper as the deceleration and force limiting energy absorbing mechanism.
Figure 4:
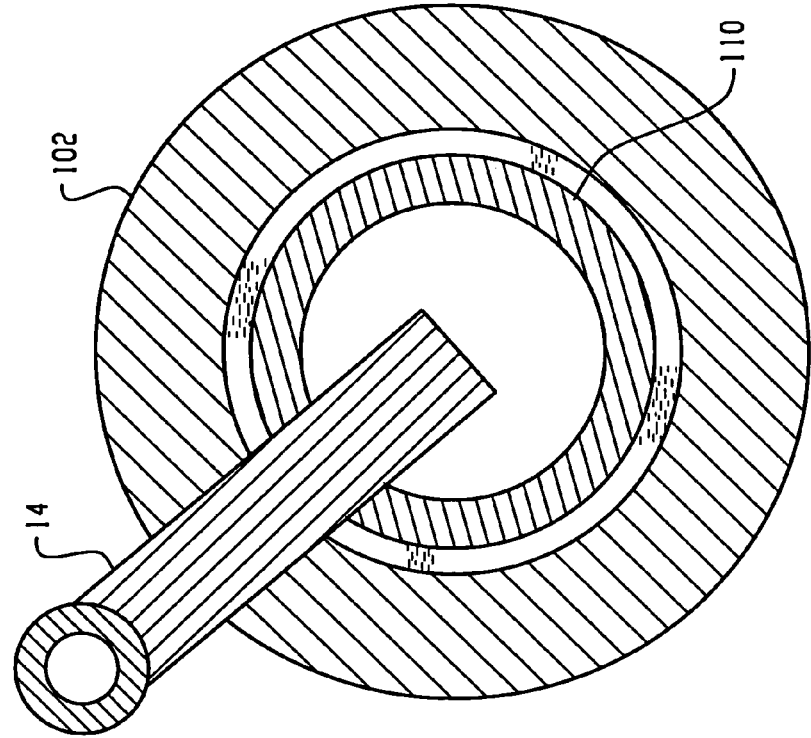

FIG. 4 illustrates an exemplary rotary or torque damper, in both top and side relationships, suitable for use as the force and deceleration limiting energy absorbing mechanism 16. The rotary damper 16 includes a cylindrically shaped housing 102, which is disposed about, and spaced radially from, a shaft 54. The shaft 54 is in rotatable communication with the housing 102. The cylindrically shaped housing 102 is sealed at both ends with end caps 106 and 108. Disposed about and spaced radially from the shaft 54, but within the housing 102, is a sleeve 110. If an MR fluid is used, sleeve 110 is preferably formed from a soft magnetic material, which may be oriented or non-oriented. The sleeve 110 is fixed to the shaft 54 by a driving disc 112 attached at one end of the sleeve 110 to form a "C"-shaped cross section. Disposed at the open end of the rotating sleeve 110 are annular seals 36 which abut a surface of the end cap 108. Also disposed between the end cap 106 and driving disc 112, about and spaced radially from the shaft 54, are annular seals 36. The various annular seals 36, the housing 102, and the sleeve 110 define a first chamber 114, in which the magnetorheological fluid 38 is enclosed. A second chamber 116 is defined by the shaft 54, the sleeve 110, the driving disc 112, and the end cap 108. Air or an inert gas is enclosed in the second chamber 116. Seals 36 also function as bearings, which permit smooth rotating contact between the sleeve/rotating disc and the respective end cap while also creating a fluidic seal between the first chamber 114 and the second chamber 116.

Within the housing 102, is the controller 18. A wire 130, in electrical communication with the controller 18, is disposed within an interior region 128 provided by the housing 102 and end cap 108. The controller 18 is capable of carrying a variable current to generate a magnetic field having a variable and controllable magnetic flux density (or an electric field having a variable and controllable potential) depending on the magnitude of the current. In this manner, the viscosity and shear properties of the rheology changing fluid 38 disposed within the first chamber 114 can be controlled. The other end of the wire is in electrical communication with a power supply (not shown) for supplying the current to the controller 18, which can be an alternating current or a direct current.

Within end caps 106 and 108, there are bearings 120, which abut shaft 54 and serve to facilitate smooth rotation of shaft 54 about a rotation axis, 122. The bearings 120 may or may not be the same as seals 36. Outside of the damper 16, the shaft 54 is connected to the latchable portion 14, which is shown as a perpendicular arm terminated by a toroidal structure. On the opposite end of damper 16, an outside surface of end cap 108 is connected to the fixed portion (not shown). Alternatively, the outside surface of end cap 108 is the fixed portion.

Initially, the latchable portion 14 is located in a first, rearward position and, when the vehicle undergoes the deceleration event, the forward motion of the child seat with respect to the decelerating vehicle is slowed down by activating the rheology changing fluid 38 with the controller 18. During operation, when an impending deceleration event and its severity and/or the mass of the seated child are detected by a sensor (not shown), the controller 18 is energized to an appropriate selected current level prior to the actual deceleration of the vehicle. When a forward movement of the latchable portion 14 occurs, the sleeve 110 is subjected to a shear force owing to the effect of the appropriate field generated by the current on the rheology changing fluid 38. The force generated is just the product of the shear force of the rheology changing fluid and the area of fluid being sheared. The energy absorbed is preferably equal to the product of the shear force owing to the magnetorheological or electrorheological fluid effect and the forward rotation of the shaft 54 (and sleeve 110) about rotation axis 122. Optionally, there is a torsion or bias spring 124, disposed on shaft 54 within the second chamber 116, which exerts a rotational force on shaft 54 to return it to its original, rearward position after the activation signal from the coil 18 is discontinued. If the torsional spring 124 is made from an active material (e.g., SMA, ferromagnetic SMA, MR or ER elastomer, EAP, or the like), it can be activated by a different activation signal to selectively change the force required to rotate the shaft and/or to facilitate the return of the shaft 54 to its original, rearward position. In this manner, the damper 16 and, ultimately, the child seat anchor assembly 10, are tunable and/or reusable.

In another embodiment, the shaft 54 serves as the latchable portion and the child seat restraint controlling the forward motion of the child seat is, for example, wrapped around an extension of the shaft 54 and is spooled out at a controlled force level upon rotation of the shaft 54.

In another embodiment of a rotary or torque damper, the shaft 54 and framing member 22 of the damper shown in FIG. 3 are in threaded communication. The shaft 54, which serves as the latchable portion, is aligned so that it is perpendicular to the motion of the child seat during the deceleration event. The child seat restraint controlling the forward motion of the child seat is, for example, wrapped around an extension of the shaft 54. Shaft 54 rotation is synchronous with plate 52 rotation and the child seat restraint is spooled out at a controlled force level upon rotation of the shaft 54.

The linear or rotary damper may further comprise a valve (not shown) for controlling the flow of the rheology changing fluid. The valve provides an additional means for tuning the stroking force, and thus the energy absorption, level. The valve may comprise an active material or may be actuated using an active material. Suitable active materials for forming the valve, or for actuating the valve, include SMAs, magnetic SMAs, piezoelectrics, EAPs, MR or ER elastomers, or a combination comprising at least one of the foregoing active materials.

In still other embodiments, the deceleration and force limiting energy absorbing mechanism 16 can be a linkage based actuator, wherein the linkage comprises the active material. The linkage may include a spring, wire, layer (i.e., a block), rolled sheet, wire mesh, foam, collapsible tube, or a combination comprising at least one of the foregoing linkages. Suitable linkage actuators are described in commonly assigned U.S. patent application Ser. No. 10/716,371, which was filed on Nov. 18, 2003 and is incorporated herein in its entirety.

Exemplary child seat anchor assemblies 10 including linkage based actuators are shown in FIGS. 5-8. In each of these Figures, the force limiting energy absorbing mechanism 16 is attached to the fixed portion 12 at one end, and at the other end to the latchable portion 12, which is illustrated in various geometries.

Figure 5:
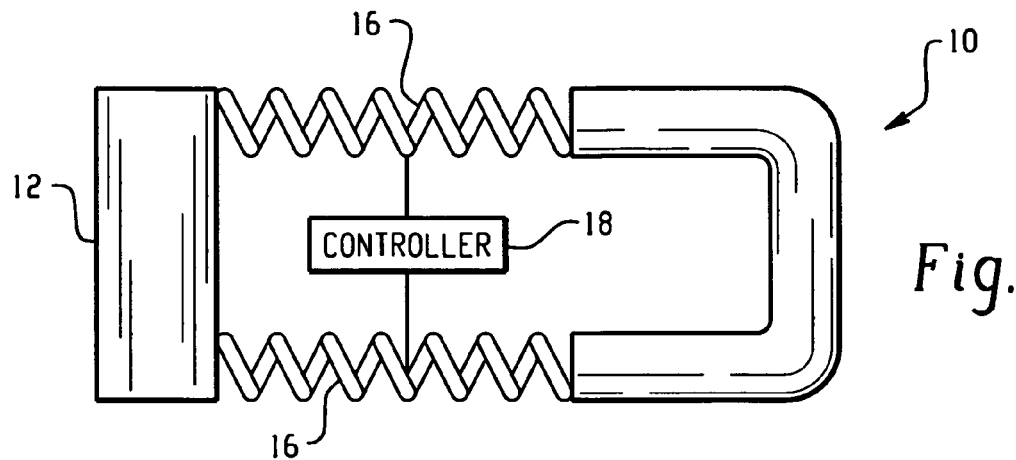
FIG. 5 is a schematic representation of a child seat anchor assembly with a spring as the deceleration and force limiting energy absorbing mechanism.

When the deceleration and force limiting energy absorbing mechanism 16 is a spring linkage as shown in FIG. 5, it can have a sufficiently large and adjustable spring constant effective to resist expansion to an extent to decelerate the child seat. Thus, the controller, by providing the activation signal, can be used to adjust the expansion force of the spring and/or return the spring to its original compressed position (utilizing its shape memory effect in the case of an SMA). Alternatively, the controller can be used to controllably expand the spring 16, which has a sufficiently small spring constant effective to contract to the compressed position upon removal of the activation signal. Suitable active materials for use in spring deceleration and force limiting energy absorbing mechanisms include SMAs, ferromagnetic SMAs, rheology changing elastomers (e.g., MR or ER elastomers), EAPs, and combinations comprising at least one of the foregoing.

Figure 6:
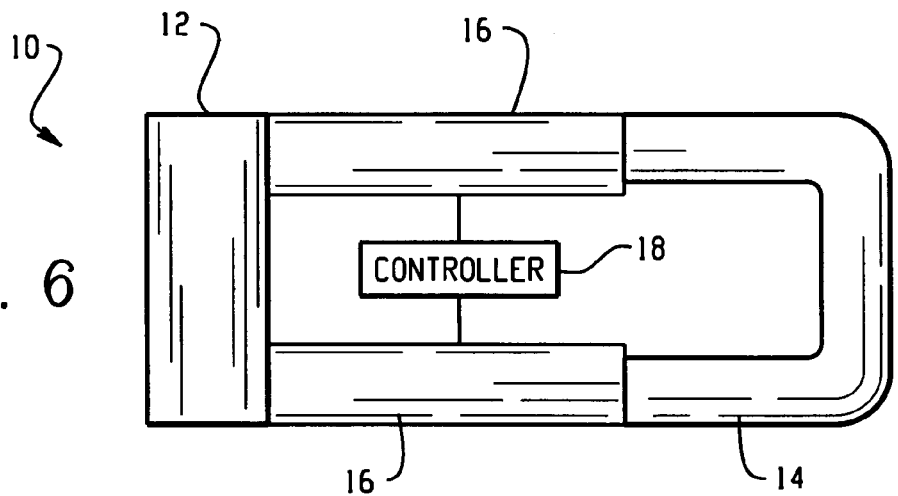
FIG. 6 is a schematic representation of a child seat anchor assembly with a wire as the deceleration and force limiting energy absorbing mechanism.
Figure 7:
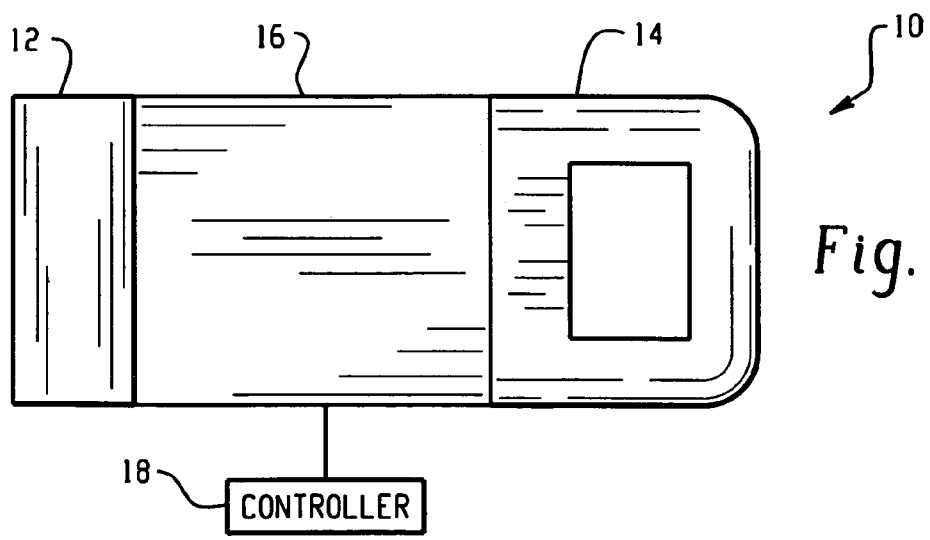
FIG. 7 a schematic representation of a child seat anchor assembly with a layer as the deceleration and force limiting energy absorbing mechanism.

When the deceleration and force limiting energy absorbing mechanism 16 is a wire or layer linkage as shown in FIGS. 6 and 7, respectively, the controller can be used to selectively apply the activation signal. This results in an increase in the stiffness which can be accompanied by an actuating force acting to change a dimension of the wire or layer, until such time when the activation signal is discontinued and the wire or layer returns to its original (i.e., prior to the distortion) modulus and/or dimension. Although these wires and/or layers can be made from shape memory active materials, they are desirably made from a piezoelectric, rheology changing elastomer, and/or electroactive polymer.

Figure 8:
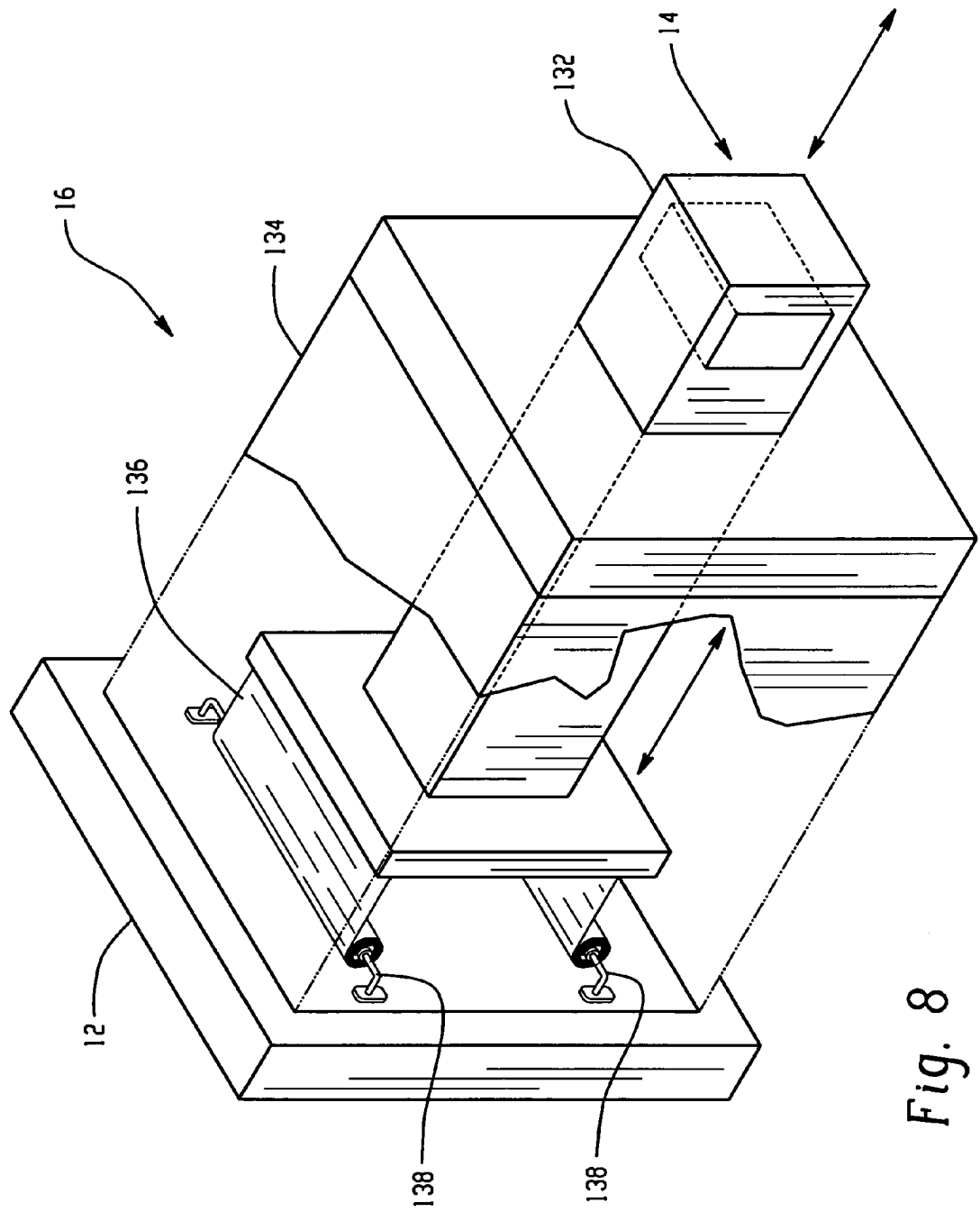
FIG. 8 a schematic representation of a child seat anchor assembly with a rolled sheet linkage as a portion of the deceleration and force limiting energy absorbing mechanism.

FIG. 8 illustrates a rolled sheet linkage based deceleration and force limiting energy absorbing mechanism 16. The mechanism generally comprises two concentric telecsoping boxes. A first box 132 is coupled to the latchable portion 14, and a second box 134 is coupled to the fixed portion 12. It is not critical which box telescopes into the other. The active material (e.g., SMA) is rolled similar to a window shade into a planar sheet roll 136. The sheet roll 136 is carried on a roll pin 138 fixed to vertical sides of the second box 134 and are substantially parallel to first box 132. The active material sheet roll 136 is initially partially rolled up. Depending upon the thickness of the sheet, it can absorb considerable energy to unwind the roll 136 into its flat sheet form. The unwinding of the sheet roll 136 progressively involves elastic strain and then strain in the form of deformation. Energy is absorbed during the unwinding of the roll 136 and any subsequent strain of the unwound sheet. Unwinding of the sheet roll 136 may be reversed by activating the active material causing the sheet to "rewind" on roll pin 138.

The child seat anchor assemblies shown in FIGS. 1-8 are exemplary only and are not intended to be limited to any particular shape, size, configuration, material composition, or the like. For example, while the latchable portion 14 has been illustrated with various geometries in FIGS. 1-8, it is not limited to the illustrated geometries. The latchable portion may adopt any geometry that can be releasably engaged with a child seat restraint. Also, the fixed portion can be secured, by means that would be known to those skilled in the art in view of this disclosure, to any rigid and/or permanent vehicle structural member. In use within a motor vehicle, the child seat anchor assemblies 10 described herein can replace the lower and/or upper anchors, either as original vehicle equipment or as an add-on component to be used instead of the existing anchors. In this manner, any child safety seat intended to be secured to a motor vehicle passenger seat using flexible or rigid restraints (i.e., without using an existing seat belt or in addition to the existing seat belt), may be used with the child seat anchor assemblies 10 described herein.

Figure 9:
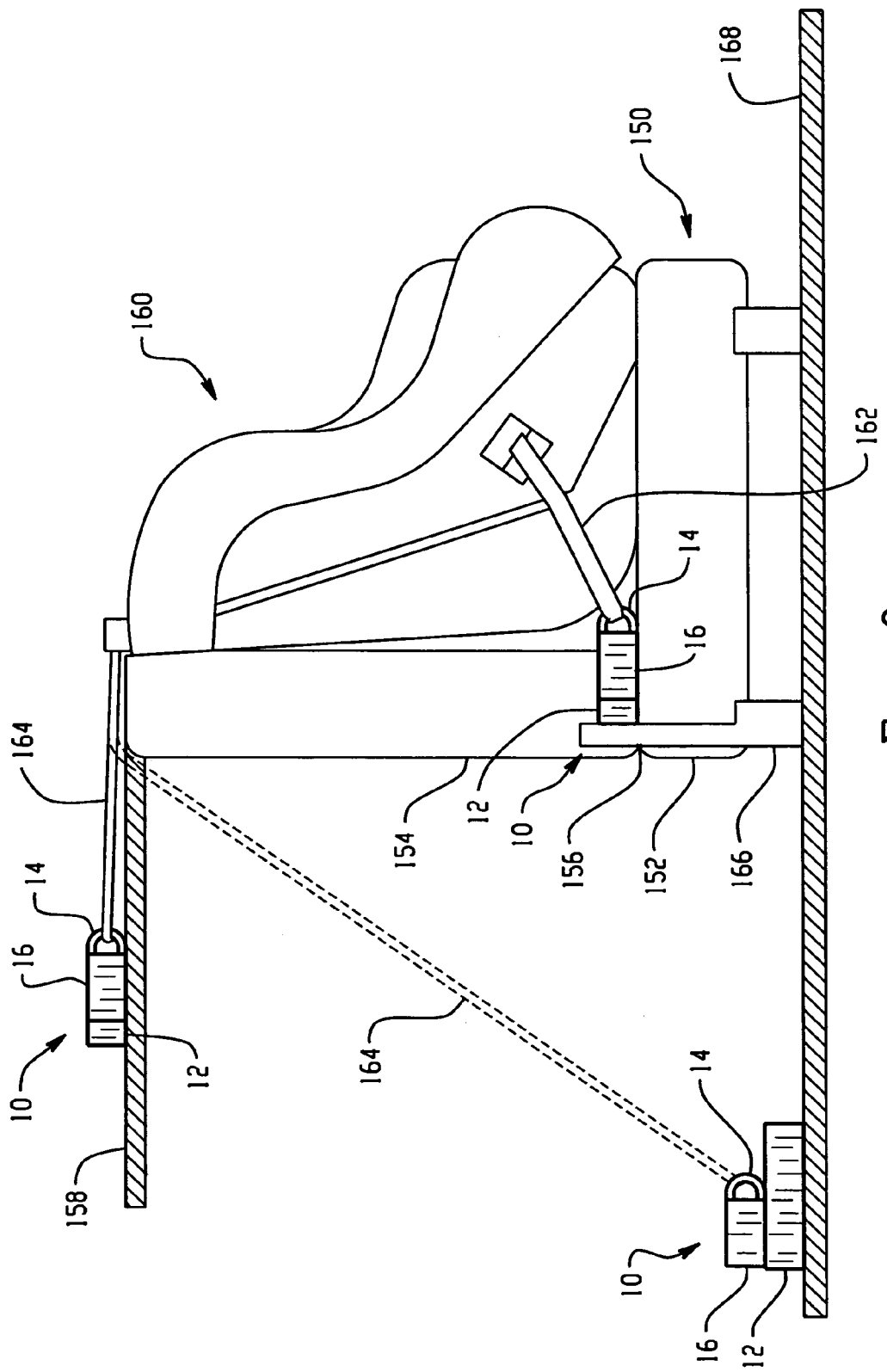
FIG. 9 is a schematic representation of the various locations in a vehicle for a child seat anchor assembly.

FIG. 9 illustrates the various locations and uses for the child seat anchor assemblies disclosed herein. A vehicle portion is shown with a vehicle seat 150 comprising a seat cushion 152 and a seat back 154 intersecting at a seat bight 156. Lower child seat anchor assemblies 10 may be positioned in the seat bight 156, such that only the latchable portion 14 is visible to the vehicle occupants. The fixed portion 12 of these lower child seat anchor assemblies 10 is secured to a seat frame 166, which itself is secured to a vehicle floor 168.

In one embodiment, a rearward package shelf 158 extends rearward from an upper end of the seat back 154. In this embodiment, upper child seat anchor assemblies 10 may be positioned on the rearward shelf 158. The fixed portion of these upper child seat anchor assemblies is secured to the shelf frame. Alternatively, when a rearward shelf 158 does not exist (e.g., in utility vehicles, vans, minivans, station wagons, convertibles, aircraft, buses, trucks, and the like), the upper child seat anchor assemblies are positioned on the vehicle floor 168 behind the vehicle seat 150. The fixed portion of these upper child seat anchor assemblies 10 is directly secured to the vehicle floor 168.

Suitable child seats 160 will be equipped with two lower restraints 162, each fixed to opposite lower portions of the child seat 160. Most forward facing child seats 160 will also be equipped with an upper restraint 164 fixed to an upper portion of the child seat 160. The child seat 160 is secured to the vehicle passenger seat 150 by engaging the lower restraints 162 to the latchable portions 14 of lower anchor assemblies 10 and engaging the upper restraint 164 (if applicable) to the latchable portion 14 of an upper assembly 10, which may or may not be configured like the lower anchor assemblies 10. After the child seat 160 is properly secured to the motor vehicle passenger seat 150, the child seat occupant (not shown) is then secured within the child seat 160 using a seat belt or other securing harness (not shown) provided by the child seat 160. During normal motor vehicle operation, the child seat anchor assemblies 10 are in a rest state and are sufficiently rigid to resist movement of the child seat 160. However, during a deceleration event, the inertia of the child seat 160 and child seat occupant generates a forward force on each anchor assembly 10. Advantageously, each anchor assembly 10 limits the immediate transfer of the forward force to the child seat 160 and its occupant by means of the deceleration and force limiting energy absorbing mechanism 16 as described above.

As previously described, suitable active materials include, without limitation, shape memory alloys (SMA), ferromagnetic SMAs, piezoelectric materials, electroactive polymers (EAP), magnetorheological fluids and elastomers (MR), electrorheological fluids and elastomers (ER), composites of one or more of the foregoing materials with non-active materials, combinations comprising at least one of the foregoing materials, and the like.

Suitable shape memory alloys can exhibit a one-way shape memory effect, an intrinsic two-way effect, or an extrinsic two-way shape memory effect depending on the alloy composition and processing history. The two most commonly utilized phases that occur in shape memory alloys are often referred to as martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like.

Selection of a suitable shape memory alloy composition depends on the temperature range where the component will operate.

The shape memory alloy may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials for use in magnetic SMAs include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(meth-acrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Piezoelectric materials can also comprise metals such as lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Specific desirable piezoelectric materials are polyvinylidene fluoride, lead zirconate titanate, and barium titanate.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example is an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversibility.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 megaPascals (MPa). In another embodiment, the polymer is selected such that is has a maximum actuation pressure between about 0.05

MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable ER fluid materials include, but are not intended to be limited to, dielectric (i.e., polarizable) particles dispersed or suspended in a carrier fluid. Suitable particles include inorganic semiconductor materials, metal oxide compounds, aluminosilicates, semiconducting organic polymers, carbon black, and intercalated graphites, and the like. Inorganic semiconductor materials include silicon, germanium, gallium arsenide, group II-IV compound semiconductor materials (e.g., ZnS, ZnSe, CdS, CdSe, CdTe, and HgCdTe), and combinations based on at least one of the foregoing. Metal oxide compounds that are suitable include iron oxides, copper oxides, titanium oxides, tin oxides, tungsten oxides, strontium titanates, barium titanates, and zirconium titanates. Semiconducting organic polymers useful as the polarizable particles are poly(anilines), poly(thiophenes), poly(p-phenylene), poly(p-phenylene vinylene), and poly(acetylene). The polymers may be undoped or doped with donor or acceptor dopants such as Na, Ca, $FeCl_3$, $AsF_5$, and I.

Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.01 micrometer, with greater than or equal to about 0.05 more preferred, and greater than or equal to about 10 micrometers especially preferred. The particles are preferably present in an amount between about 5.0 to about 50 percent by volume of the total ER fluid composition.

Suitable carrier fluids for the rheology changing fluid include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total rheology changing fluid, and preferably less than or equal to about 3.0%. Also, the amount of polar organic solvents is preferably greater than or equal to about 0.1%, and more preferably greater than or equal to about 1.0% by volume of the total rheology changing fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the rheology changing fluid is less than or equal to about 10 percent by weight of the total rheology changing fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total rheology changing fluid.

Optional components in the rheology changing fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable rheology changing elastomer materials include, but are not intended to be limited to, an elastic polymer matrix comprising a suspension of magnetic or dielectric particles, wherein the particles are described above. Suitable polymer matrices include, but are not limited to, poly-alpha-olefins, natural rubber, silicone, polybutadiene, polyethylene, polyisoprene, or other polymeric materials described herein.

Advantageously, the above noted child seat anchor assemblies utilizing deceleration and force limiting energy absorbing mechanisms based on active materials are relatively robust and versatile. For example, it should also be recognized by those skilled in the art that the child seat anchor assemblies described herein may be used not only during deceleration events, but also in other instances where control of the accelerations and forces felt by a child seat occupant is desired. Such other instances include an aircraft experiencing turbulence, an aircraft contacting ground during landing, driving over a speed bump, driving over a pothole, and the like. In another advantageous feature that should be recognized by those skilled in the art, the child seat anchor assemblies described herein are reversible, (i.e., they allow for energy absorption without the need for replacing the child seat restraint or motor vehicle anchor assembly after a single use). In yet another advantageous feature that should be recognized by those skilled in the art, the child seat anchor assemblies described herein, through the use of sensors that can provide various information, allow for the accelerations and forces felt by a child seat occupant to be selectively tailored or tuned based on the child mass, the child anthropometry, and/or the vehicle deceleration rate.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A child seat anchor assembly comprising:
   a fixed portion, wherein the fixed portion is secured to a motor vehicle structural member or a child seat structural member;
   a latchable portion for releasable engagement with a child seat or a motor vehicle;
   an energy absorbing mechanism disposed between and in operative communication with the fixed portion and the latchable portion, wherein the energy absorbing mechanism comprises an active material; and
   a controller in operative communication with the active material, wherein the controller is operable to selectively apply an activation signal to the active material and effect a change in an attribute of the active material, wherein the change in the attribute results in force and acceleration adjusting energy absorption.

2. The child seat anchor assembly of claim 1, wherein the active material comprises a shape memory alloy, ferromagnetic shape memory alloy, magnetorheological fluid, magnetorheological elastomer, electrorheological fluid, electrorheological elastomer, electroactive polymer, a piezoelectric material, a composite comprising at least one of the foregoing active materials with a non-active material, or a combination comprising at least one of the foregoing.

3. The child seat anchor assembly of claim 1, further comprising a sensor in operative communication with the controller, wherein the sensor is configured to provide information to the controller for selectively applying the activation signal to the active material.

4. The child seat anchor assembly of claim 3, wherein the sensor comprises a weight sensor, impact sensor, pre-impact sensor, or a combination comprising at least one of the foregoing sensors.

5. The child seat anchor assembly of claim 1, wherein the activation signal comprises a thermal activation signal, a magnetic activation signal, an electrical activation signal, a mechanical activation signal, a pneumatic activation signal, or a combination comprising at least one of the foregoing activation signals.

6. The child seat anchor assembly of claim 1, wherein the energy absorbing mechanism is a damper, actuator, or a combination comprising at least one of the foregoing energy absorbing mechanisms.

7. A child seat anchor assembly comprising:
   a fixed portion, wherein the fixed portion is secured to a motor vehicle structural member or a child seat structural member;
   a latchable portion for releasable engagement with a child seat or a motor vehicle;
   a damper disposed between and in operative communication with the fixed portion and the latchable portion, wherein the damper comprises a rheology changing fluid; and
   a controller in operative communication with the rheology changing fluid, wherein the controller is operable to selectively apply an activation signal to the rheology changing fluid and effect a change in a shear force of the rheology changing fluid, wherein the change in the shear force results in force and acceleration adjusting energy absorption.

8. The child seat anchor assembly of claim 7, further comprising a sensor in operative communication with the controller, wherein the sensor is configured to provide information to the controller for selectively applying the activation signal to the rheology changing fluid.

9. The child seat anchor assembly of claim 7, further comprising a valve for controlling the flow of the rheology changing fluid.

10. The child seat anchor assembly of claim 7, wherein the damper is a linear or rotary damper.

11. The child seat anchor assembly of claim 10, wherein the linear damper comprises a control structure comprising a sleeve, a seal at each end of the sleeve, the rheology changing fluid disposed between the seals, and the controller in proximity to the rheology changing fluid; and a movable surface fixedly attached to a support member, wherein the support member is in sliding engagement with the seal and the rheology changing fluid of the control structure.

12. The child seat anchor assembly of claim 11, wherein the linear damper further comprises a spring, disposed within an annular recess of the support member, having one end fixedly attached to a transverse member and an other end fixedly attached to the movable surface.

13. The child seat anchor assembly of claim 10, wherein the linear damper comprises a movable surface fixedly attached to a shaft, wherein the shaft is slidably engaged with a stationary framing member; a plurality of plates disposed in the stationary framing member, wherein each plate is substantially parallel to an adjacent plate, and wherein the plurality of plates are alternatingly attached to the shaft and the stationary framing member to define a space between adjacent plates; the rheology changing fluid disposed in the space; and the controller in proximity to the rheology changing fluid.

14. The child seat anchor assembly of claim 10, wherein the rotary damper comprises a cylindrically shaped sleeve disposed about and spaced radially from a shaft and fixedly attached to the shaft by a rotating disc, wherein the shaft is in rotatable communication with a cylindrically shaped housing disposed about and spaced radially from the sleeve, wherein the housing is sealed at each end with end caps; a first seal disposed between an open end of the sleeve and an end cap; a second seal disposed between the rotating disc and an end cap; the rheology changing fluid disposed in a chamber defined by the housing, the sleeve and the seals; and a controller disposed in proximity to the rheology changing fluid.

15. The child seat anchor assembly of claim 14, wherein the rotary damper further comprises a torsional spring, disposed on the shaft and within an annular recess of the sleeve.

16. A method, comprising:
securing a child seat to a structural member, wherein the securing comprises engaging a restraint of the child seat with a latchable portion of a child seat anchor assembly having a fixed portion secured to the structural member;
producing an activation signal with a controller;
applying the activation signal to an active material of a force limiting energy absorbing mechanism disposed between and in operative communication with the fixed portion and the latchable portion of the child seat anchor assembly, wherein the applying effects a change in an attribute of the active material; and
adjusting a force and/or deceleration to which the child seat is subjected with the energy absorbing mechanism.

17. The method of claim 16, further comprising sensing a deceleration event.

18. The method of claim 16, further comprising sensing a weight and/or anthropometry of the child seat and/or a child seat occupant.

19. The method of claim 16, further comprising sensing the magnitude of deceleration.

20. The method of claim 16, wherein a magnitude of a force generated by the force limiting energy absorber is selectively controlled based on information provided by a sensor in operative communication with the controller.

* * * * *